United States Patent [19]
Ferkinhoff et al.

[11] Patent Number: 5,777,948
[45] Date of Patent: Jul. 7, 1998

[54] METHOD AND APPARATUS FOR PREFORMING MUTATIONS IN A GENETIC ALGORITHM-BASED UNDERWATER TARGET TRACKING SYSTEM

[75] Inventors: David J. Ferkinhoff, Middletown; John G. Baylog, Tiverton, both of R.I.

[73] Assignee: The United States of America as represented by the Secretary of the Navy, Washington, D.C.

[21] Appl. No.: 747,469

[22] Filed: Nov. 12, 1996

[51] Int. Cl.$^6$ .............................. H04B 11/00; G01S 3/80
[52] U.S. Cl. ........................ 367/131; 367/124; 364/516
[58] Field of Search .................... 367/131, 124; 364/516, 517

[56] References Cited

U.S. PATENT DOCUMENTS 5,222,192  6/1993  Shaefer ........................... 395/13
5,471,434  11/1995  Davis et al. ..................... 367/124
5,581,490  12/1996  Ferkinhoff et al. ............. 364/578

*Primary Examiner*—Ian J. Lobo
*Attorney, Agent, or Firm*—Michael J. McGowan; Michael F. Oglo; Prithvi C. Lall

[57] ABSTRACT

A method for performing mutations in a genetic algorithm-based underwater acoustic contact tracking system includes the steps of: (i) providing an initially ordered list of bit numbers; (ii) selecting a random number from a uniform distribution of numbers; (iii) performing an inverse mapping of the selected random number via a binomial distribution, to determine a number of bits to mutate; (iv) determining if mutation is to be performed; (v) selecting particular bits to mutate; (vi) complementing selected bits; and (vii) outputting mutated contact state variables. The invention further contemplates a system for performing the above method.

10 Claims, 5 Drawing Sheets

METHOD AND APPARATUS FOR PREFORMING MUTATIONS IN A GENETIC ALGORITHM-BASED UNDERWATER TARGET TRACKING SYSTEM

STATEMENT OF GOVERNMENT INTEREST

The invention described herein may be manufactured and used by or for the Government of the United States of America for governmental purposes without the payment of royalties thereon or therefor.

BACKGROUND OF THE INVENTION

(1) Field of the Invention

The invention relates to sensor-based and genetic algorithm-based underwater target tracking systems and is directed more particularly to a method and apparatus for performing mutations within a genetic algorithm for estimating contact state variables, which method requires less computation time than prior art methods.

(2) Description of the Prior Art

Detection of a moving object, such as a target, and determination of its range, bearing, speed and course in an ocean environment is a difficult task, particularly if the target is moving relatively noiselessly, and it is desired to perform the detection as early as possible.

Contact tracking involves processing data from various sensors to provide an estimate of the position and velocity, or state, of the contact. Reliable and unique acoustic contact state estimates can be obtained under favorable noise, geometric and environmental conditions, or highly observable conditions. However, most practical situations do not fulfill such conditions, which together with the inherent uncertainty in selecting appropriate mathematical models, causes instability in the estimation process. In addition, the relationship between the contact state and the observed measurements is nonlinear; therefore, any linearization procedures applied can introduce additional estimation errors. Under these conditions, alternative algorithms that provide efficient and reliable estimates are needed.

Various gradient-based estimation techniques, such as extended Kalman filters or maximum likelihood estimators, are available to provide tracking estimates by searching for the peak of the target state density function. One such system is described in U.S. Pat. No. 5,471,434 to John S. Davis et al, entitled "System and Method for Rapidly Tracking Vehicles of Special Utility in Low Signal-to-Noise Environments", assigned to the assignee of the present invention. This patent is incorporated by reference and the practical application of the present invention as a substitute for the gradient-based estimation technique therein is discussed herebelow. The gradient-based estimation techniques disclosed in the aforesaid prior art U.S. Pat. No. 5,471,434 employ a search procedure based on the local gradient of the density function, which can lead to convergence to local maxima. Another potential problem associated with the algorithms is that they can diverge when the problem becomes ill-conditioned, such as when the measurements are very noisy or the data are sparse and intermittent. These conditions are especially prevalent when tracking with active or passive data in a shallow-water environment. The target state density function in the aforesaid U.S. Pat. No. 5,471,434 is a four-dimensional (4-d) function representing all possible states in a state-space estimation system relative to an underwater acoustic contact. What is being searched for is a set of state parameters at a peak of the abstract hypervolume representing the function. It is to be appreciated that although U.S. Pat. No. 5,471,434 is cited as exemplary of the utilization of the search technique of the present invention, the invention has general utility for searching for peaks in functions of two or more dimensions (or even of a single dimension). It is to be understood that for the purposes of this specification and the appended claims, the word "peak" includes maxima or minima ("negative peaks") peaks, global peaks (singularly the highest, or singularly the lowest values of the function) or local peaks (submaximal peak values of the function). Likewise, for the purposes of this specification and its appended claims, the meaning of the term "state-space" refers to all possible states in which solutions of the physical system search problem may be found (sometimes heuristically described as "all possible states of the world").

Because of their processing stability, grid-based techniques have recently been applied to the target state estimation problem. Unlike their gradient-based counterparts, the grid-based techniques estimate, or search for, the unknown contact parameters by direct reconstruction of the state density function. In this process, a grid of predetermined size and resolution is typically used, and the value of the density function is computed at all grid points. In principle, this computationally expensive technique can provide the desired efficacy; however, it lacks efficiency. In addition, the grid must be properly placed, and the resolution and size must be appropriately selected to properly represent the contact state density.

More recently, attention has focused on the application of random search-type techniques to contact tracking. Specifically, there is under development a composite search technique incorporating both a simulated anneal algorithm (SA) and a genetic algorithm (GA) as part of an information and decision system which selects one or the other of such algorithms for the provision of an optimum solution of the contact state estimation problem. The applicability of SA's and GA's, whether as initialization schemes, or as stand-alone tracking algorithms, is also under consideration. The random search-type algorithms do not use gradients and can be more efficient than grid-based algorithms. Thus, they are promising candidates for solving the contact tracking problem under poor observability and/or multimodal conditions.

The genetic algorithm (GA) takes its name from the study of genetics in biology, where the rule in nature is survival of the fittest. In this process, individuals in the population with the best genes suited for the local environment have a better chance of surviving to produce offspring, thus passing their genes to the next generation. A global environment can have several local environments, each having an associated set of appropriate genes. For instance, a given geographic location can have a forested area that supports browsers, while a nearby plain can support grazers. The phenomenon in which different gene sequences are more appropriate for the different local environments is known as niche sharing. The genetic method of propagating genes to subsequent populations is through the use of three probabilistic mechanisms: parent selection (which allows the best individuals from the current population to have a higher probability of being selected), crossover or mating (which forms new genes by combining sequences from the parents and passes the new genes along to children), and mutation (which helps to prevent loss of genetic information).

Adapting the GA for contact tracking mimics the survival of the fittest rule by defining a binary coding of the contact state variables and operating on the bits in the same manner as genes in biology. For the state estimation, or search problem, the process of determining which genes are best suited for the local environments is equivalent to finding the maxima in a multimodal density function. Thus, the problem becomes one of finding the bit sequences that, after converting to real numbers, determine the locations of the various maxima (peaks) in the contact state density function or equivalently, the minima (negative peaks) in the "cost" or "penalty" function (the "cost" referred to is a penalty in terms of accepting error).

Parent selection is a probabilistic method for selecting the best-fit individuals (or samples) for mating from a population of size P. Each sample of the population has an associated fitness, or performance value, $$\text{perf}(\hat{X}_i)$$

wherein $$\text{perf}(\hat{X}_i) = \frac{1}{\|Z - H(X) \times \|^2 W^{-1}} \bigg| X = \hat{X}_i \quad (1)$$

$$i = 1, 2 \ldots P.$$

In the parent selection process, stochastic errors in sampling caused by small P can lead to excessive self replication by high performance samples. This can result in clustering of these samples about one maximum of the state density function, or local environment. For the tracking problem, many situations warrant finding all maxima in the state density function. Thus, a mechanism similar to the one which produces niche sharing is used to distribute samples among other peaks in the state density function, and care is taken to select a large enough population size to facilitate niche sharing.

Niche sharing is facilitated by scaling the performance values relative to the distance among all samples in the population. Specifically, the sum of the Euclidean distances from the $k^{th}$ sample to all others can be defined as $$D(\hat{X}_k) = \sum_{i=0}^{P} \|\hat{X}_K - \hat{X}_i\|^2 \Omega_k \quad (2)$$

where $\Omega_k$ is a weighting vector, $$\Omega_k = \begin{bmatrix} \omega_{Rxk} \\ \omega_{Ryk} \\ \omega_{Vxk} \\ \omega_{Vyk} \end{bmatrix} \quad (3)$$

For $$d_k \in \{\hat{R}_{xk}, \hat{R}_{xk}, \hat{V}_{xk}, \hat{V}_{xk}\}$$

with corresponding maximum $d_{max}$ and minimum $d_{min}$, the components for the weighting vector in the $k^{th}$ sample are defined as $$\omega_{dk} = \left[ 1.0 + 1.9 \left| \frac{\hat{d}_k - \frac{d_{max} + d_{min}}{2}}{d_{max} - d_{min}} \right| \right]^{-1} \quad (4)$$

The performance function can now be scaled by $$D(\hat{X}_K)$$

as $$pf(\hat{X}_k) = D(\hat{X}_k) \text{ perf}(\hat{X}_k) \quad (5)$$

which is subsequently normalized to reflect the probability of selection as $$pf(\hat{X}_k) = \frac{pf1(\hat{X}_k)}{\sum_{i=1}^{P} pf1(\hat{X}_i)} \quad (6)$$

$$k = 1, 2 \ldots P$$

Parent selection can now be performed P times, i.e., select $X_L$ if $$\min_L \left[ \sum_{i=1}^{L} pf(\hat{X}_i) \right] > U[0,1] \quad (7)$$

where $U[0,1]$ is a random number obtained from a uniform distribution between zero and one.

Once two parents have been selected, crossover is performed based on a pre-specified probability. The combination of parent selection and crossover is the major search mechanism of the algorithm; therefore, the probability of crossover is typically greater than 90 percent. If crossover is not performed, the parents are copied identically to the child population. When crossover is performed, a crossover site is first randomly chosen in the bit string, where the same crossover site is used for both parents to preserve the length of the bit strings. The two substrings located after the crossover site for the two parents are exchanged to create two new strings, or children.

Multiple crossing sites can also be used, in which case every other sub-string is exchanged. Using more crossing sites scrambles the longer gene sequences, while using fewer crossing sites results in fewer combinations of genes. Thus, the desired stability of the gene sequences is taken into account when determining the number of crossing sites.

The number of crossover sites typically is initially relatively large, and is decreased in steps when the current number of generations equals multiples of one quarter of the maximum number of generations. This allows the algorithm to form short bit sequences in early generations, while subsequently allowing longer bit strings to form with a higher probability of surviving to subsequent generations.

Once all crossover operations are completed, several options are available for handling the disposition of the children. For instance, they can be accumulated until an arbitrary number of children are produced, at which time they can either replace the current population, or can be added immediately to the current population, thus increasing the size of the population.

A mutation operator is included to preserve genetic information; that is, if important genetic information is bred out of the population, a mutation of the genes can reintroduce this information. Mutation is performed randomly as follows. For all samples, starting at the first bit, a uniformly distributed random number, $U[0,1]$, is compared to a threshold. If the random number exceeds the threshold, the bit is complemented; i.e., for $i^{th}$ bit and mutation threshold $\upsilon_m$, $$b_i = \bar{b}_i \text{ if } (\upsilon_m < U[0,1]) \quad (8)$$

Regardless of the outcome, the same procedure is applied until all bits in the population are visited. A high probability of mutation effectively destroys the bit sequences, yielding an inefficient search mechanism. For this reason, to allow the bit strings to stabilize, the probability of mutation is typically less than 10 percent and is adjusted in a manner similar to changing the number of crossover sites.

In applying GAs to a target tracking problem, a binary representation of the state parameters is used, and the search procedure to minimize the cost is performed iteratively. Each member of the population corresponds to a sample of the state space. Let $n_j$ represent the number of bits for the $j^{th}$ component of the contact state vector. Thus, for the $i^{th}$ sample, $$\begin{bmatrix} Rx_{tbi} \\ Ry_{tbi} \\ Vx_{tbi} \\ Vy_{tbi} \end{bmatrix} = \begin{bmatrix} b_0RXi & b_1RXi & b_2RXi & \ldots & b_{nRXi} \\ b_0Ryi & b_1Ryi & b_2Ryi & \ldots & b_{nRyi} \\ b_0VXi & b_1VXi & b_2VXi & \ldots & b_{nVXi} \\ b_0VYi & b_1VYi & b_2VYi & \ldots & b_{nVYi} \end{bmatrix} \quad (9)$$

where an unsigned integer coding scheme was chosen. Here, $b_{oj}$ is the most significant bit, $b_{nj}$ is the least significant bit, and the sign information is taken care of when converting to real numbers. The binary representation of the ith target state is then constructed by concatenating the binary representation of the state variables into a binary sequence as $$X_{Tbi} = \{Rx_{Tbi}\ Ry_{Tbi}\ Vx_{Tbi}\ Vy_{Tbi}\} \quad (10)$$

and concatenating these binary sequences for the entire population into a single binary sequence as:

$$X_{Tb} = \{X_{Tb0}\ X_{Tb1}\ \ldots\ X_{Tbp}\} \quad (11)$$

The algorithm is first initialized by randomly distributing ones and zeros in the binary sequence, $X_{Tb}$, for all samples in the population, where the probability of any bit being a one is 50 percent and is independent of the other bits in the population. The performance function is defined as in equations (1) through (6). It is to be appreciated that the binary representation of the target state (equation 10) is conventionally transformed from binary number form to real number form when equations (1) through (6) are applied.

The parent selection, crossover and mutation operations are subsequently applied in an iterative manner to find the maxima in the performance function. For each iteration or generation, the performance is computed for each sample. Parent selection and crossover are next performed P/2 times. This generates a new population of P samples which replaces the parent population. Mutation is performed and the performance of those few samples that were mutated is computed. This process continues until stopping criteria are met. These criteria can include: a maximum number of generations is reached, a maximum performance value (minimum cost) is reached, or the population is stabilized.

While the application of GA to estimate the target state parameters is similar to a grid-based search, in that it searches from a sampling of the target state space, it has been theoretically determined that the GA performance that is achieved in searching n points in the state space is equivalent to that of a grid searching $n^3$ points. This is because the algorithm concentrates its search more in the areas of maxima that it finds; i.e., it is as if the resolution of a nonuniform grid is dependent upon the value of the density function at the grid points.

Referring to FIG. 1, it will be seen that the steps of a traditional genetic algorithm, as applied to target tracking, include the following:

A step 11 provides an initial multiplicity of binary representations of target state samples in a heuristic manner consistent with the application.

A step 12 computes a number indicative of the performance of each target state sample of the multiplicity of target state samples.

A step 13 evaluates the number relative to user defined stopping criteria to determine if the algorithm should continue.

A step 14 selects a portion of the multiplicity of target state samples to serve as parents from which to generate a further multiplicity of target state samples.

A step 15 generates the further multiplicity of target state samples by performing crossover (in the same manner that gene splicing is performed in biological systems).

A step 16 performs mutation of a selected percentage of the multiplicity of the binary representations (to maintain genetic diversity in a similar manner to biologic mutation of a gene).

A step 17 selects individual samples of the initial multiplicity of samples, and the further multiplicity of samples to provide a current multiplicity of samples.

Finally, a step 18 repeats steps 12 through 17 using the current multiplicity of samples in place of the initial multiplicity of samples; and a step 19 outputs final contact state variables.

Referring to FIG. 2, it will be seen that within a traditional genetic algorithm, the mutation step 16 (FIG. 1) includes the following described component steps:

A step 101 selects a random number from a uniform distribution of numbers.

In a step 102, there is undertaken an examination as to whether the number selected in step 101 is no more than a selected probability of mutation threshold, and if so, complements a bit selected from one of the current multiplicity of binary representations of target state samples.

In a step 103, steps 101 and 102 are repeated until all bits in the current multiplicity of target state samples are evaluated.

In a step 104, the evaluated bits of the multiplicity are outputted as a new current multiplicity of samples.

This traditional method of mutation is fairly simple to implement. However, it requires a significant amount of computer time because there are thousands of bits in a typical population, requiring a large number of iterations of the routines, one iteration for each bit.

Since there is a need to reduce the computer time required, and mutation time is a substantial portion of the computer time required, a significant reduction in mutation time is deemed beneficial.

SUMMARY OF THE INVENTION

Accordingly, an object of the invention is to reduce substantially the time required for performing the mutation portion of a genetic algorithm type search process.

Another object is to provide such substantial reduction of time required for performance of the mutation portion of a genetic algorithm process by means of a mode which is of special utility in underwater acoustic target, or contact tracking systems.

A further object of the invention is to reduce such time requirement for searching for peaks in functions having one or more degrees of dimensionality.

A still further object of the invention is to reduce such time requirement which is of special utility in searching for peaks of a hypervolume representing functions having more than three degrees of dimensionality.

In furtherance of the above, a still further object of the invention is to provide an improved method for performing mutations in a genetic algorithm-based underwater target tracking system.

A still further object of the invention is to provide apparatus for performing mutations in a genetic algorithm-based underwater tracking system.

With the above and other objects in view, as will hereinafter appear, a feature of the present invention is the provision of a method for performing mutations in a genetic algorithm-based underwater tracking system, the method comprising the steps of: (i) providing an initially ordered list of bit numbers; (ii) selecting a random number from a uniform distribution of real numbers ranging from 0 through 1; (iii) performing an inverse mapping of the selected random number via a binomial distribution, to determine a number of bits to mutate;(iv) determining if mutation is to be performed; (v) selecting particular bits to mutate; (vi) complementing selected bits; and (vii) outputting mutated contact state variables.

A further feature of the invention is to provide a system for performing mutations in a genetic algorithm-based underwater tracking system, the system comprising: (i) an initial bit pointer list generator for providing an initially ordered list of bit numbers; (ii) a uniform random number generator for selecting a random number from a uniform distribution of numbers; (iii) a binomial inverse mapper for performing an inverse mapping of the selected random number via a binomial distribution to determine a number of bits to mutate; (iv) a mutation indication tester for determining if mutation is to be performed; (v) a bit selection device for selecting particular bits to mutate; (vi) a bit complementer for complementing selected bits; and (vii) a final bit stream provider for outputting mutated contact state variables.

The above and other features of the invention, including various novel method steps and combinations of parts, will now be more particularly described with reference to the accompanying drawings and pointed out in the claims. It will be understood that the particular method and apparatus embodying the invention are shown by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings.

DESCRIPTION OF THE PREFERRED EMBODIMENT

Figure 3:
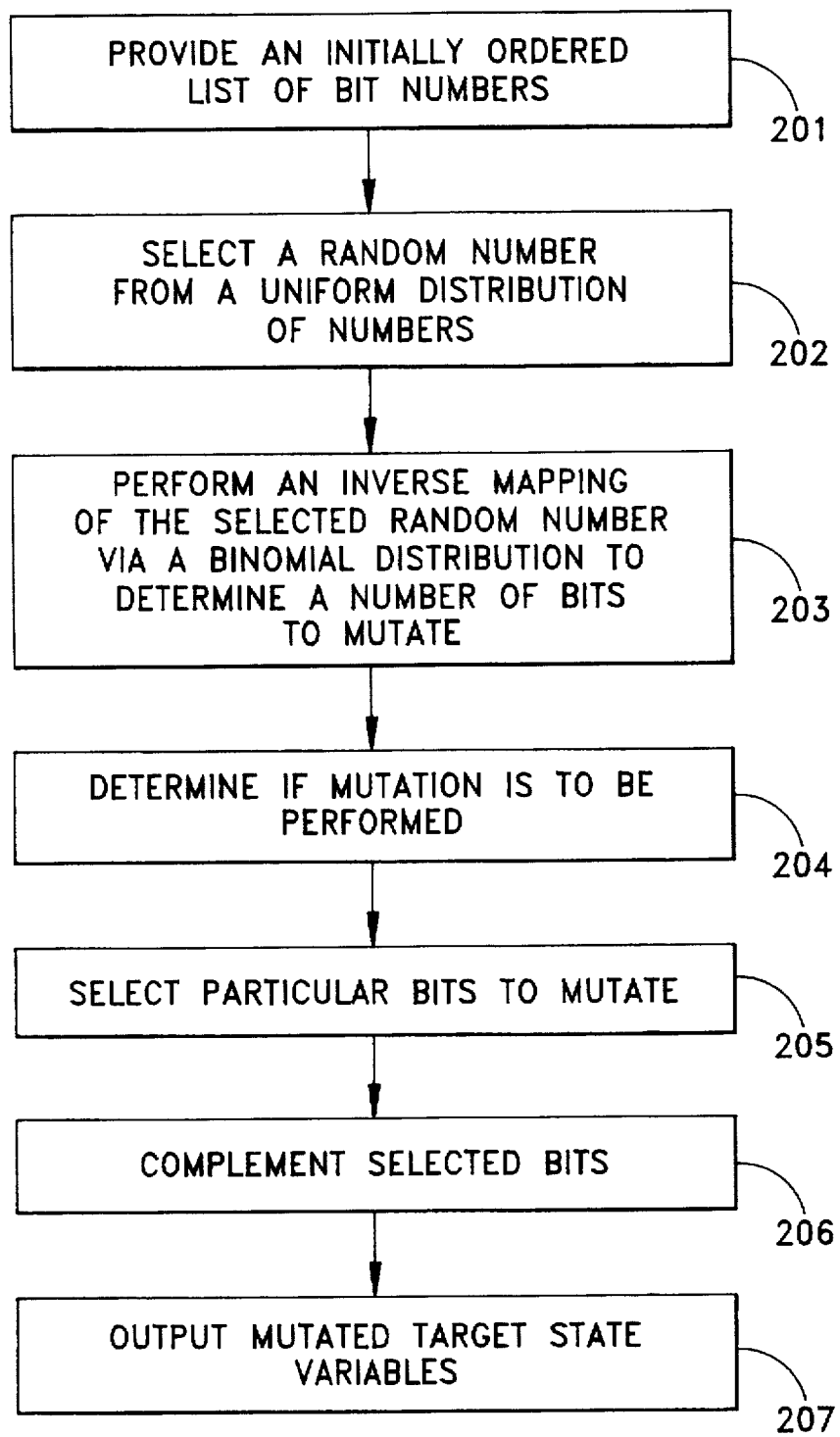
FIG. 3 is a block diagram showing one form of the new method for performing mutation within the context of genetic algorithms.
Figure 4:
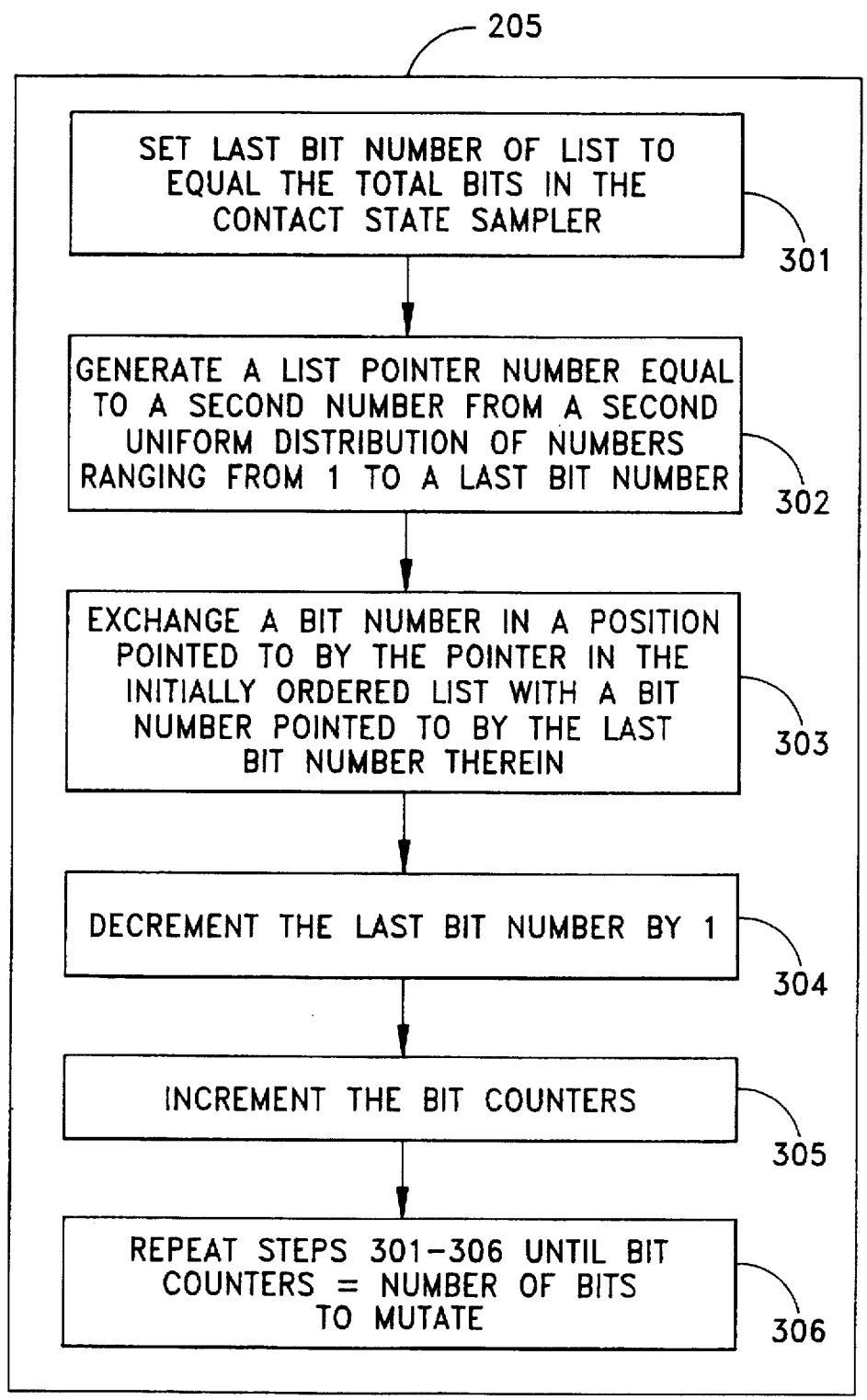
FIG. 4 is a block diagram showing component steps of a step 205 of FIG. 3.

The present invention provides a new method of mutation within the context of genetic algorithms. The new method of mutation is more efficient in respect of computational time, and thereby provides a faster tracking system. The new method of mutation is performed as illustrated in FIGS. 3 and 4, and includes the following steps:

Provide an initially ordered list of bit numbers, step 201 (FIG. 3), ranging from 1 to a total number of bits in a multiplicity of target state samples.

Select a random number from a uniform distribution of real numbers, step 202, the distribution of numbers ranging from 0 through 1.

Perform an inverse mapping of the selected random number via a binomial distribution, using a selected probability of mutation and the total number of bits in the multiplicity of target state samples, to determine a number of bits to mutate, step 203.

Determine if mutation is desired, step 204, by (a) setting a bit counter to 0; and, (b) if the bit counter is equal to the number of bits to mutate, outputting mutated contact state variables. If the bit counter is not equal to the number of bits to mutate, select a particular bit number, step 205, from the initially ordered list of bit numbers by: (a) setting a last bit number equal to the total bits in the multiplicity of target state samples, step 301 (FIG. 4); (b) generating a list pointer number set equal to a second random number selected from a uniform distribution of integers of numbers ranging from 1 to the last bit number, step 302; (c) exchanging a bit number in a position pointed to by the list pointer number in the initially ordered list of bit numbers with a bit number in a position pointed to by the last bit number in the initially ordered list of bit numbers, step 303; (d) decrementing the last bit number by one, step 304; (e) incrementing the bit counter, step 305; and (f) repeating (b)–(e) until the bit counter is equal to the number of bits to mutate, step 306.

Complement bits, step 206 of the multiplicity of target state samples given the last bit counter positions of the initially ordered list of bit numbers.

Output mutated target state variables, step 207.

Figure 5:
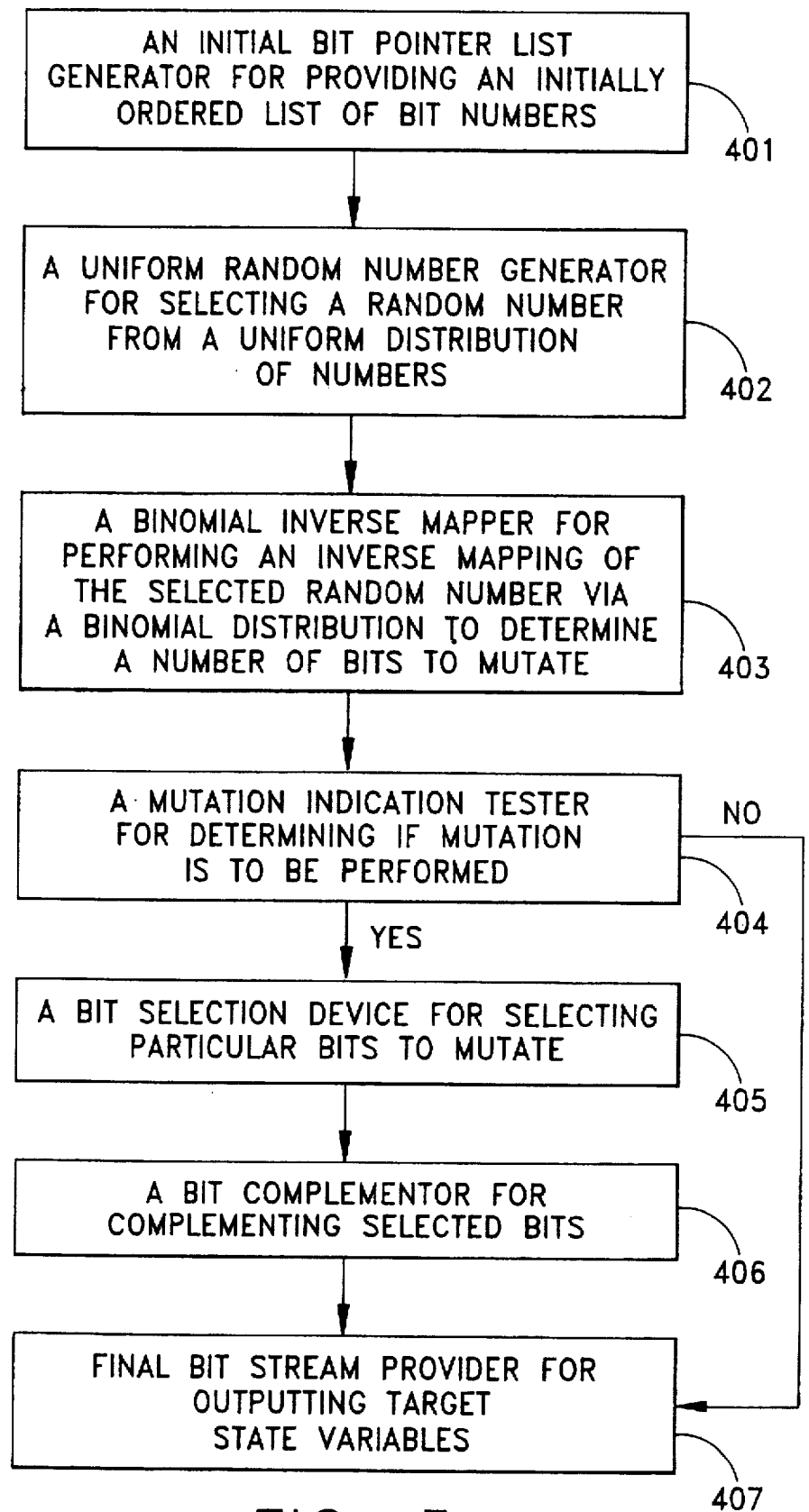
FIG. 5 is a block diagram showing one form of system for performing mutation within the context of genetic algorithms.

The present invention further provides a new system for mutation within the context of genetic algorithms, which new system is more efficient with respect to computational time and therefore provides for a faster target tracking system. The new system is illustrated in FIG. 5 and includes an initial bit pointer list generator 401 for providing an initially ordered list of bit numbers, a uniform random number generator 402 for selecting a random number from a uniform distribution of real numbers, and a binomial inverse mapper 403 for performing an inverse mapping of the selected random numbers via a binomial distribution to determine a number of bits to mutate.

The system further includes a mutation indication tester 404 for determining if mutation is to be performed, a bit selector device 405 responsive to a "YES" signal from the mutation indication tester for selecting particular bits to mutate, a bit complementer 406 for complementing selected bits, and a final bit stream provider 407 responsive to the bit complementer, and responsive to a "NO" signal from the mutation indication tester, for outputting mutated target, or contact state variables.

A "NO" output from the mutation indication tester 404 triggers a signal from the tester 404 to the final bit stream provider 407 to output the contact state variables. A "YES" output from the tester 404 triggers a signal from the tester to the bit selection device 405 to select the particular bits to mutate.

The final bit stream provider 407 is adapted to receive actuating signals from the tester 404 and the bit complementer 406.

Figure 1:
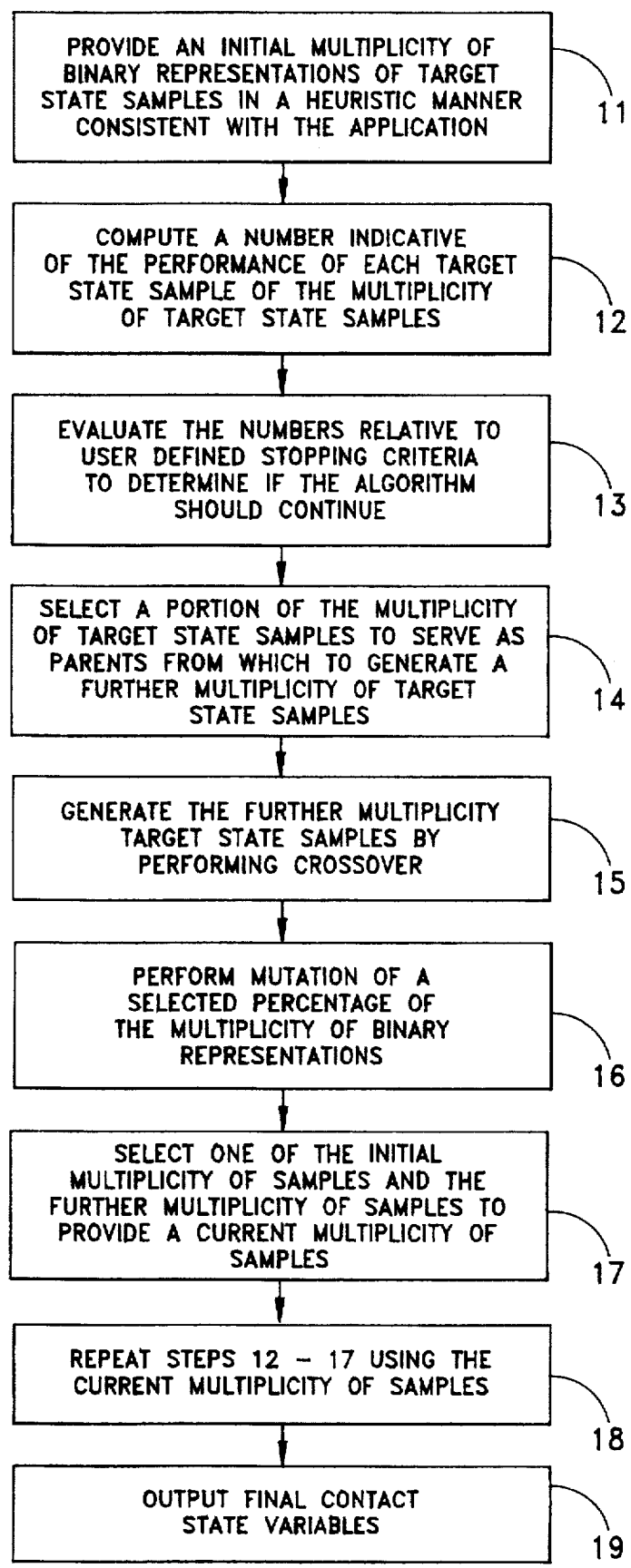
FIG. 1 is a block diagram illustrative of a prior art method for genetic algorithm application to target tracking.
Figure 2:
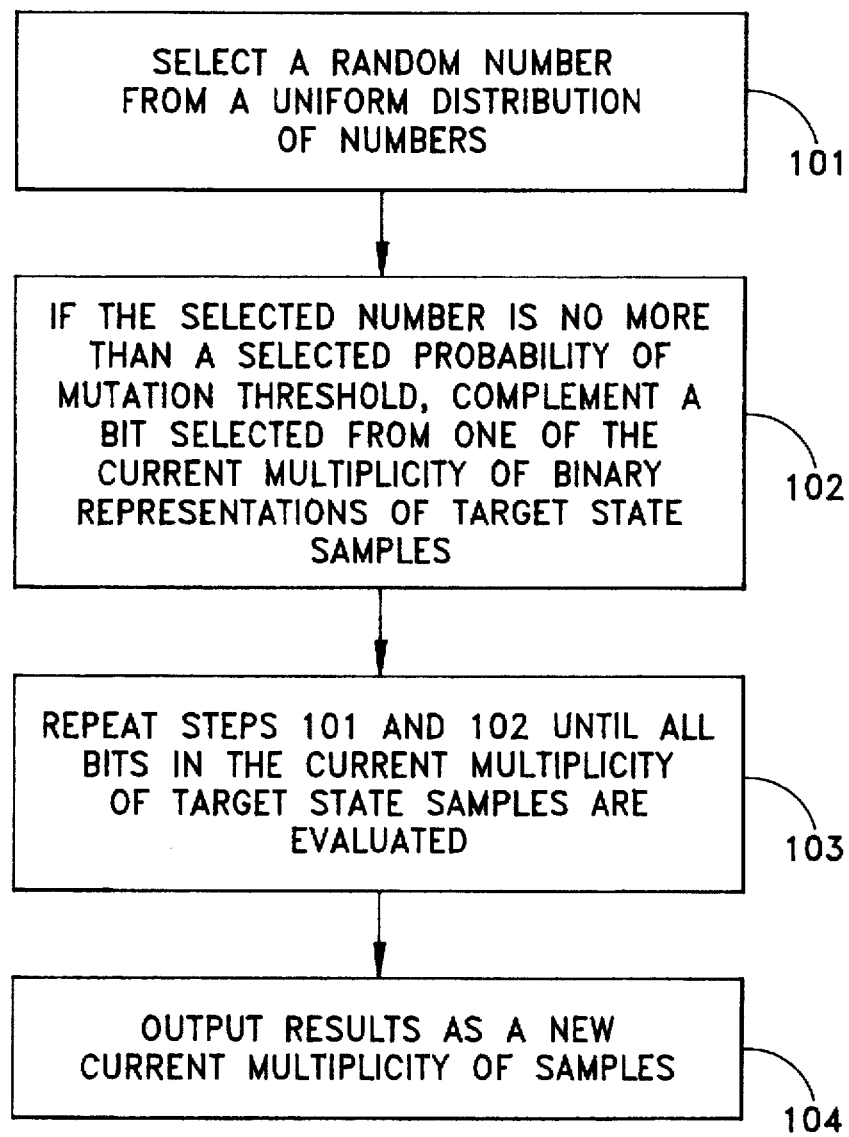
FIG. 2 is a block diagram illustrative of a prior art method for performance of mutation within a genetic algorithm.

There is thus provided a method and system for performing mutations in genetic algorithm-based searches for "peaks" (defined in the "Description of the Prior Art" section hereinabove) of a hypervolume function of target, or contact state of a type estimation or tracking system. Again referring to U.S. Pat. No. 5,471,438, either the mutated target state output variables from the method of FIGS. 3 and 4, herein or such output variables from the apparatus of FIG. 5, herein is effective to enhance the convergence of a genetic algorithm if same would be applied to block 22, FIG. 1B of '438. Moreover, this enhancement of convergence substantially reduces the required computer time, in turn enabling the tracking system to process a larger population of acoustic target, or contact datums. The section of the aforesaid U.S. Pat. No. 5,471,438 appearing after "Description of Preferred Embodiment" and before the claims, and the Figures referred to therein (column 2, line 40—column 8, line 34, and FIGS. 1A through 3), is hereby incorporated by reference in its entirety.

It will be appreciated that the method and system of the present invention may alternatively be implemented by software programs controlling a programmable computer, or by hardware-based apparatus consisting of general purpose, or custom designed integrated circuit (I.C.) devices, including I.C. microprocessors and permanent instructions containing memories (e.g., E-PROMS).

It is to be understood that the present invention is by no means limited to the particular apparatus and steps herein disclosed and/or shown in the drawings, but also comprises any modifications or equivalents within the scope of the claims.

What is claimed is:

1. In a process for tracking a target vehicle in an ocean environment, utilizing successively received acoustic sensor signals representative of contact state variables of the target vehicle, a combination of steps comprising:

providing binary coding of the contact state variables;

providing an initially ordered list of bit numbers from the coding;

selecting a random number from a uniform distribution of numbers;

performing an inverse mapping of said selected random number via a binomial distribution, to determine a number of bits to mutate;

determining if mutation is to be performed;

selecting particular bits to mutate;

complementing selected bits; and outputting mutated contact state variables to generate tracking information for use in the target tracking process.

2. The method in accordance with claim 1 wherein said bit numbers in said initially ordered list of bit numbers range from 1 to a number equal to a total number of bits in a multiplicity of target state samples.

3. The method in accordance with claim 2 wherein said uniform distribution of numbers ranges from 0 to 1.

4. The method in accordance with claim 3 wherein said inverse mapping is performed using a selected probability of mutation of said total number of bits in said multiplicity of target state samples.

5. The method in accordance with claim 4 wherein said selected particular bits comprise selected particular bit numbers of said bits in said multiplicity of target state samples.

6. The method in accordance with claim 5 wherein selection of particular bit numbers is performed by:

setting a bit counter to 0;

if said bit counter is equal to said number of bits to mutate, outputting mutated contact state variables;

if said bit counter is not equal to said number of bits to mutate, selecting a bit number from said initially ordered list of bit numbers by:

(i) setting a last bit number equal to said total bits in said multiplicity of target state samples;

(ii) generating a list pointer number equal to a second random number selected from a second uniform distribution of numbers ranging from 1 to said last bit number;

(iii) exchanging a bit number in a position pointed to by said list pointer number in said initially ordered list of bit numbers with a bit number in a position pointed to by said last bit number in said initially ordered list of bit numbers;

(iv) decrementing said last bit number by one;

(v) incrementing said bit counter; and (vi) repeating said steps (ii)–(v) for selecting the bit number until said bit counter is equal to said number of bits to mutate.

7. The method in accordance with claim 6 wherein said step of complementing selected bits comprises complementing selected bits of said multiplicity of target state samples given by the last bit counter positions of said initially ordered list of bit numbers.

8. Apparatus for tracking a target vehicle in an ocean environment in connection with successively received acoustic signal contact state variable items representative of the motion and position of the target vehicle, said apparatus comprising:

an initial bit pointer list generator for providing an initially ordered list of bit numbers from binary coding of the contact state variable items;

a uniform random number generator for selecting a random number from a uniform distribution of numbers;

a binomial inverse mapper for performing an inverse mapping of the selected random number via a binomial distribution to determine a number of bits to mutate;

a mutation indication tester for determining if mutation is to be performed;

a bit selection device for selecting particular bits to mutate;

a bit complementer for complementing selected bits; and a final bit stream provider for outputting mutated contact state variables items, to generate tracking information for further tracking apparatus.

9. The apparatus in accordance with claim 8 wherein upon a "NO" output from said mutation indication tester, said tester is adapted to signal said final bit stream provider to output said contact state variables, and upon a "YES" output from said mutation indication tester, said tester is adapted to signal said bit selection device to select said particular bits to mutate.

10. The apparatus in accordance with claim 9 wherein said final bit stream provider is adapted to receive actuating signals from said mutation indicating tester and said bit complementer, and in response thereto to output said mutated contact state variables.

* * * * *